Figure 1:
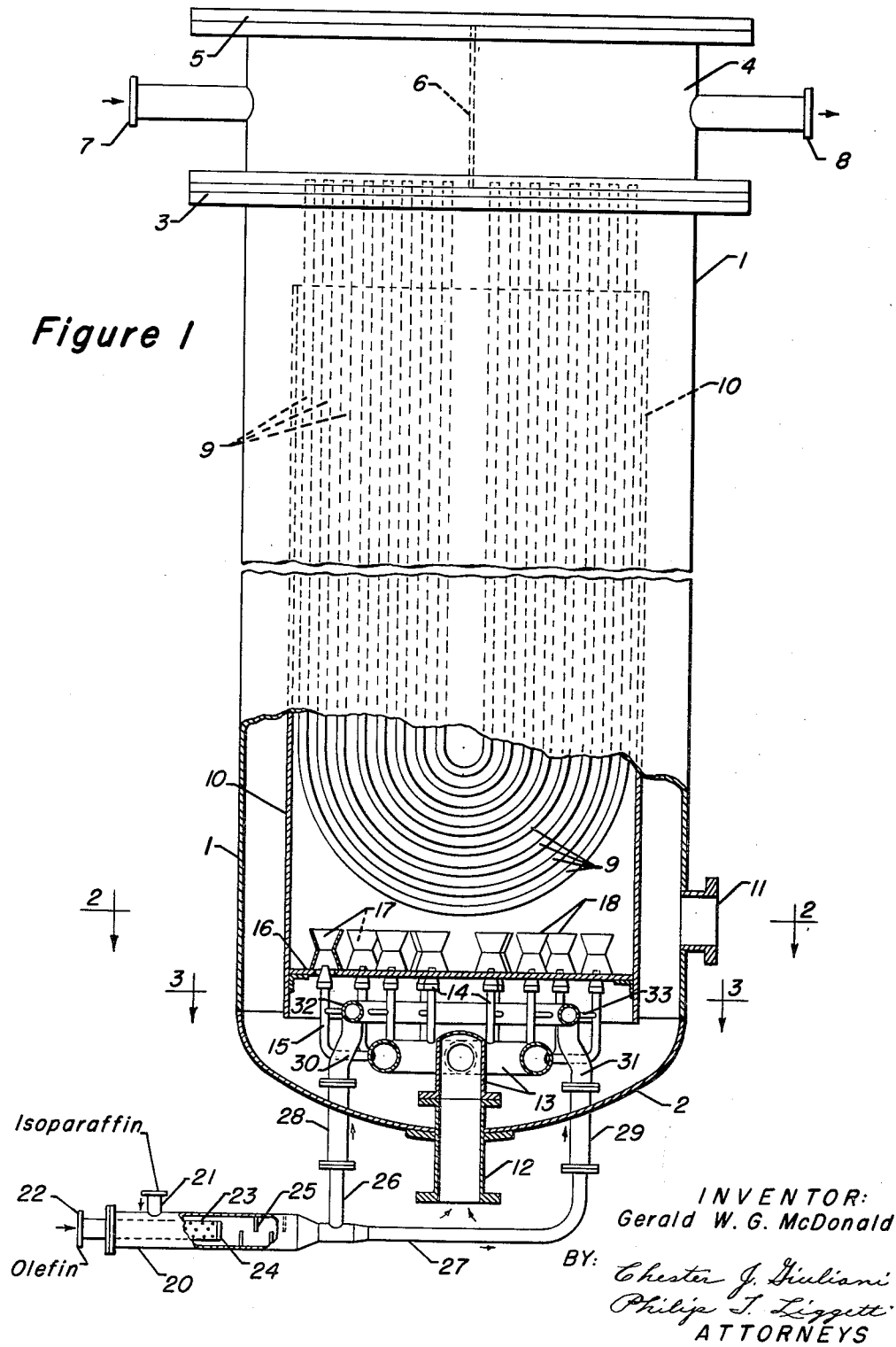

May 12, 1964 G. W. G. McDONALD 3,133,128
CONTACTING OF FLUIDS
Filed Sept. 12, 1960 2 Sheets-Sheet 1

Isoparaffin
Olefin

INVENTOR:
Gerald W. G. McDonald

BY: Chester J. Giuliani
Philip T. Liggett
ATTORNEYS

May 12, 1964  G. W. G. McDONALD  3,133,128
CONTACTING OF FLUIDS
Filed Sept. 12, 1960  2 Sheets-Sheet 2

INVENTOR:
Gerald W. G. McDonald
BY:
Chester J. Giuliani
Philip T. Liggett
ATTORNEYS United States Patent Office 3,133,128
Patented May 12, 1964

3,133,128
CONTACTING OF FLUIDS
Gerald W. G. McDonald, Mount Prospect, Ill., assignor to Universal Oil Products Company, Des Plaines, Ill., a corporation of Delaware
Filed Sept. 12, 1960, Ser. No. 55,445
8 Claims. (Cl. 260—683.58)

This invention relates to an improved means for the contacting of fluids, and more particularly to an improved method and apparatus for converting or treating reactant fluids under conditions requiring good mixing and close control of reaction conditions.

Various methods for effecting flow-mixing and various types of mixing reactors have been utilized in processing plants, however, it is a principal object and feature of the present improved arrangement to provide for the efficient mixing of separate fluid streams and the internal recirculation of at least one fluid medium within a reaction zone without the use of mechanical agitating means.

It is also a principal object of the invention to provide means for effecting efficient mixing and contact of liquid reactant streams with a liquid catalyst. It is a further object of the invention to provide means for the contacting of immiscible liquid streams under controlled conditions within a reaction zone having temperature control means combined therewith.

For example, the present method of effecting mixing and the improved apparatus embodiment is particularly adapted for use in effecting rapid and uniform mixing of reactant streams in the presence of a substantially immiscible liquid having a different density or specific gravity than the reactant streams, as is carried out in the catalytic alkylation of hydrocarbons. In the alkylation process, isoparaffins are reacted with olefins in the presence of a mineral acid catalyst, such as hydrofluoric acid, sulfuric acid or phosphoric acid. The reactants and catalyst are introduced into a reaction zone in a liquid state and are maintained at a temperature suitable for conducting the desired reaction. Temperature control is particularly desirable in effecting the alkylation reaction in order to minimize the polymerization of the olefinic portion of the reactant stream. It has been found that the polymerization is reduced by conducting the reaction at reduced temperatures so that it is thus desirable to provide cooling or heat exchange means in connection with the reaction zone in order to maintain optimum conversion conditions. The hydrocarbons and the acid catalyst are substantially immiscible and it is, therefore, desirable to provide apparatus means which permits at least a partial separation of these materials prior to discharging a product stream, whereby a substantial quantity of the heavier acid catalyst phase is maintained within the contacting zone for recirculation and reuse in contacting the continuously introduced hydrocarbon reactant streams. However, in a reactor unit operating at a high rate of internal flow there will be a short residence time and but little phase separation, such that there is primarily a mixed hydrocarbon-catalyst phase being recirculated.

In a broad aspect, the present invention provides a method for continuously alkylating an isoparaffin hydrocarbon with an olefinic hydrocarbon in the presence of a liquid acid catalyst in a manner which comprises, passing an olefinic reactant stream into admixture with an isoparaffin reactant stream and passing the mixture into a reaction zone, therein dividing the stream into a plurality of smaller streams each of which contacts and mixes with one of a plurality of separate liquid acid catalyst streams, such liquid acid catalyst being introduced into and upwardly within the reaction zone in a plurality of separate upflowing jet streams whereby the resulting mixed fluid streams of reactants and catalyst effect the eduction and upward recirculation of a liquid acid catalyst containing mixed phase passing to the lower portion of the reaction zone, and continuously withdrawing a reaction product stream from the reaction zone.

In a preferred system, the olefinic reactant stream is sprayed in a plurality of jet streams into admixture with the isoparaffin stream flowing in a confined flow path as a preliminary mixing operation prior to the reactants mixing with the acid catalyst stream in the lower portion of the reaction zone. The resulting mixed reactant and catalyst streams are then jetted upwardly through the reaction zone and through spaced venturi-shaped eductor means therein such that the internal recirculation of the hydrocarbon and acid catalyst phase is enhanced as it is returned to the lower portion of the reaction zone. Also, in connection with the alkylation process, the mixed streams are preferably passed in heat exchange relationship with a cooling medium such that the exothermic heat of reaction is dissipated and polymerization limited.

The present invention also embodies an improved apparatus arrangement which comprises in combination, a vertically disposed housing or vessel adapted to retain fluids, having an open-ended cylindrical baffle positioned concentrically within and spaced from the inner wall and ends of the housing, a transverse baffle extending across the lower end of the cylindrical baffle and having a plurality of spaced openings therethrough, with each of the openings having a venturi-shaped passageway means connecting therewith, fluid inlet means through the lower portion of the housing having fluid distributing means connecting therewith and positioned below the transverse baffle, with said distributing means having a plurality of outlet nozzles therefrom and with a nozzle being directed into each of said plurality of openings and venturi-passageways of said transverse baffle whereby fluid recirculation within said housing is enhanced, additional fluid inlet means to the lower portion of the housing and conduit means connecting last said fluid inlet means to each of the plurality of outlet nozzles of said distributing means for effecting the mixing of fluids from said fluid inlet means, and contacted fluid outlet means from the housing at an elevation above the lower end of the cylindrical baffle therein.

A preferred appartus means also provides flow mixing means for effecting a preliminary mixing of separate fluid reactant streams ahead of the outlet nozzles on the distributing means within the lower portion of the reaction zone such that where three fluid streams are being contacted one with another, there is a preliminary mixing of two of the reactant streams ahead of the admixture with the third. Further, in the preferred embodiment of an apparatus utilized for the alkylation of hydrocarbons in the presence of a liquid acid catalyst, the reaction zone is preferably provided with a heat exchange coil suspended vertically within the central portion thereof such that the mixed reactant streams and liquid catalyst will pass over and in indirect heat exchange relationship with a cooling medium maintained within the heat exchange coil whereby to effect controlled conversion conditions.

Referring to the accompanying drawing and the following description thereof will serve to more clearly illustrate the construction and arrangement of one embodiment of the present improved apparatus, as well as means for implementing an improved flow system in effecting closely controlled reactions.

FIGURE 1 of the drawing is an elevational view, partially in section, showing means for effecting the desired mixing of fluid reactant streams.

Figure 2:
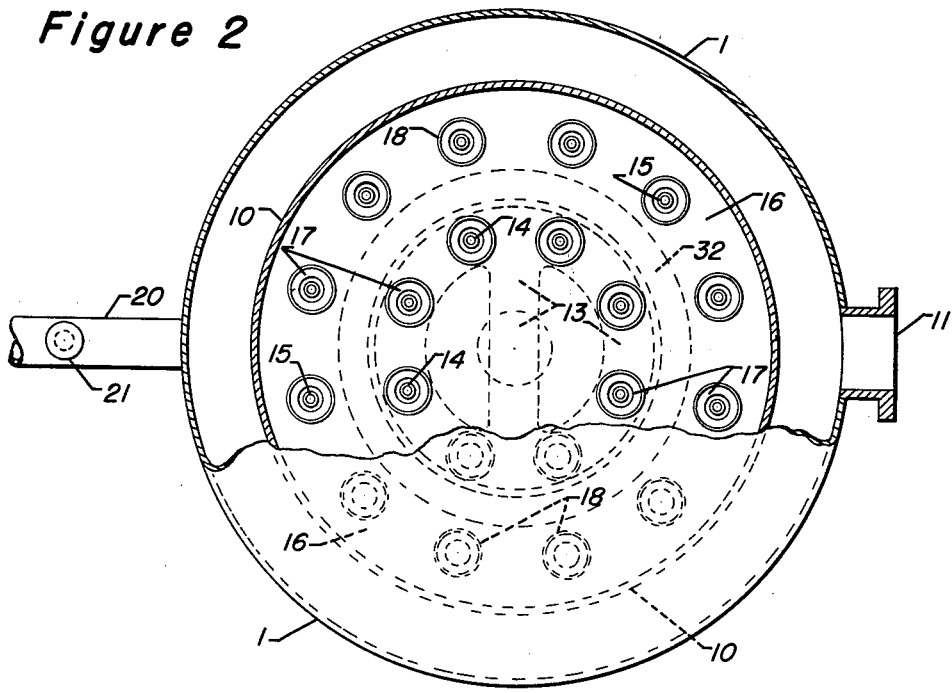

FIGURE 2 of the drawing is a sectional plan view through a portion of the lower end of the apparatus, as indicated by the line 2—2 in FIGURE 1 of the drawing.

Figure 3:
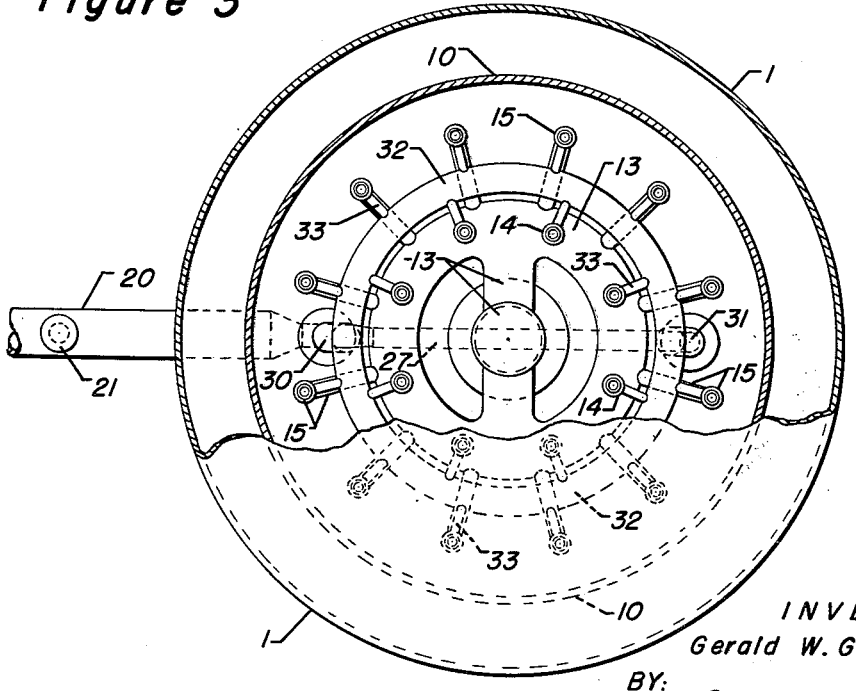

FIGURE 3 of the drawing is still another sectional plan view through the apparatus, as indicated by the line 3—3 in FIGURE 1.

Referring now to the drawings, there is shown a pressure-tight housing or vessel 1 having a closed lower end or bottom head 2 and a flanged upper end 3. The flanged upper end 3 is adapted to support and connect with a cooling fluid distribution and collecting header 4 which in turn has a closed end or cover portion 5. The header 4 is divided by a suitable partitioning plate 6 such that it is provided with a fluid inlet portion having an inlet nozzle 7 and a fluid outlet portion having an outlet nozzle 8. Each half of the header connects with a U-shaped tube bundle 9 suspended therefrom into the internal lower portion of the reaction zone.

Suspended vertically within the inner portion of the housing 1 is a cylindrically shaped open-ended baffle plate 10 that is spaced from the inner wall of the housing 1 as well as upwardly from the lower head 2. This cylindrical baffle plate 10 encompasses the heat exchange tube bundle 9 and serves, as will hereinafter be more fully explained, as a draft-tube to aid in the recirculation of the heavier liquid phase within the reaction zone. The cylindrical baffle 10 is also spaced from the upper portion of the housing and below the flanged top end 3 of the chamber, such that a mixed fluid phase and product may flow over the top end of the baffle and into the annular space between it and the inside wall of the housing 1. A product outlet nozzle 11 is provided in the side wall of the housing 1 such that a product stream may be continuously withdrawn from the housing.

At the lower end of the chamber or housing 1 is a fluid inlet nozzle 12 which has a pipe or conduit extending upwardly into the lower end of the chamber and connecting with a fluid distributing means 13. As may be noted from FIGURE 3 of the drawing, the distributing means 13 may be of a ring-like shape and have a plurality of spaced upwardly projecting fluid outlet nozzles. An inner circular arrangement of nozzles 14 extend directly vertically upwardly from the ring portion, while an outer circular arrangement of nozzles 15 project upwardly and outwardly from the side of the ring-shaped distributing header. The upper tips of the nozzles 14 and 15 terminate at the zone of a horizontal or transverse baffle 16 which is supported from and extends across the inside lower end of the cylindrical baffle 10. The baffle 16 is in turn provided with a plurality of spaced openings 17 which are arranged to align with the circular arrangements of the nozzles 14 and 15 from the distributing means 13. The openings 17 are in turn in alignment with connecting venturi-shaped passageway means 18. The venturi passageways 18 in the present embodiment are supported on and project upwardly from the transverse baffle plate 16, however, such passageways may connect with and depend downwardly from the baffle plate or be mounted within the opening 17 such that a portion of the passageway is above and a portion below the level of the plate 16.

It may be seen that upon the operation of the unit, the jet streams of fluid from the plurality of nozzles 14 and 15 will be directed upwardly through each of the plurality of venturi-shaped openings 18 such that there is an ejector or eductor effect created within the lower portion of the reaction zone and the heavier liquid phase which is present within the lower portion of the chamber will be moved upwardly through the central portion of the cylindrical baffle 10 along with the reactant fluids being ejected upwardly through the nozzles 14 and 15.

A preferred embodiment of the flow-mixing reactor of the present invention provides means for effecting a preliminary mixing of reactant streams ahead of the outlet nozzles 14 and 15. In one arrangement, as shown in FIGURE 1, one reactant stream may enter an elongated conduit 20 through an inlet nozzle 21 while a second fluid stream may be introduced into the inside of the enlarged conduit 20 by means of an inlet nozzle 22 and a perforated fluid distributing pipe 23. The fluid distributing pipe 23 having a closed end 24 effects the introduction of fluid through nozzle 22 into the interior of conduit 20 in a plurality of jet-like streams which in effect spray into the continuously flowing stream being introduced by way of nozzle 21. Further mixing of the resulting admixed reactant streams may be effected by staggered baffle plates 25 at the downstream end of the elongated conduit 20. Thus, resulting mixed fluid reactants are introduced into the lower end of the reaction chamber 1 by suitable additional conduit means. The present embodiment illustrates two conduits 26 and 27 connecting with two separate fluid inlet nozzles 28 and 29 which in turn have internal conduit means 30 and 31 connecting to a distributing header 32. The distributing header 32 has a ring-like form that is of size to be positioned between the upwardly projecting nozzles 14 and 15, and has a plurality of lateral pipe-like connectors 33 which connect with the outlet nozzles 14 and 15 whereby the mixed fluid reactants may in turn be introduced into and admixed with the fluid stream passing upwardly through nozzles 14 and 15 from distributing means 13, whereby all fluid streams introduced into the reaction zone are mixed in a nozzle means prior to being ejected upwardly into the enlarged central contacting zone within the central portion of the cylindrical baffle 10 and around the heat exchange tube bundle 9.

In effecting an efficient alkylation of isoparaffin and olefinic hydrocarbons, the present improved apparatus may be utilized in the following manner. The olefinic hydrocarbon stream is introduced through the nozzle 22 and the perforate pipe 23 such that it is sprayed in a plurality of jet-like streams into a continuously flowing isoparaffin stream entering nozzle 21 and passing laterally through the internal portion of elongated conduit 20. The resulting mixed streams are then distributed through distributing means 32 into admixture with the liquid acid catalyst phase being introduced by means of inlet 12 and distributing means 13 to the plurality of upwardly projecting nozzles 14 and 15. The resulting mixed reactants and acid catalyst are then jetted upwardly through the venturi means 18 into the internal portion of cylindrical baffle 10 and in the zone of the heat exchange tube bundle 9. Within the upper portion of the housing 1 the resulting alkylated product stream and immiscible liquid acid catalyst phase, which, as noted hereinbefore, may comprise a mineral acid such as hydrofluoric acid, sulfuric acid or phosphoric acid, will tend to effect some degree of gravity separation. In an operation having a slow circulation rate the heavier acid catalyst phase descends into the concentric space between baffle 10 and the housing wall 1 to the lower portion of the reaction zone within the lower head 2, while the lower density alkylate product stream may be withdrawn from the housing by way of outlet nozzle 11 for further treatment and recovery. In a unit maintaining a rapid circulation rate, there will be very little phase separation and a mixed hydrocarbon-acid catalyst phase is continuously circulated in the unit. It may thus be seen that in any case, an acid containing phase is maintained within the housing and is caused to flow upwardly through the interior of the cylindrical baffle 10 and then downwardly around the outside of the baffle in the annular zone provided within the housing, such that the cylindrical baffle 10 is acting as a draft tube for the continuous recirculation of the acid in a mixed phase. In the alkylation operation, cool water or refrigerant may be passed through the tube bundle 9 to effect the desired temperature control of the alkylation reaction, however, where it is desired to use the present apparatus for other conversions, which conversions may require the addition of heat, in which case a heated fluid medium may be passed through the tube bundle 9 by means of the inlet and outlet nozzles 7 and 8 such that a desired temperature is maintained within the reaction zone for an endothermic conversion.

The present embodiment illustrates two conduits 26 and 27 introducing a split reactant stream into the lower end of the reaction zone to connect with the distributing header 32, however, it is obvious that a single conduit means may be utilized if desired to effect the passage of the fluids into the distributing header 32 for subsequent distribution into admixture with the fluid medium being passed to distributing header 13. Also, other shaped fluid distributing means and geometrical arrangements of nozzles may be utilized to effect a uniform distribution of upwardly projecting jet streams of mixed fluids being introduced into the lower end of the reaction zone, however, in each instance the tips of the nozzles 14 and 15 should terminate about level with the lower ends of the venturi-shaped passageways, as well as be in alignment therewith, such that the desired eduction effect is obtained in the reaction zone.

I claim as my invention:

1. An alkylation process which comprises introducing a mixture of isoparaffin and olefinic hydrocarbons into the lower portion of a reaction zone containing a settled liquid acid catalyst phase in its lower portion, therein dividing the mixture into a plurality of streams and commingling each of said streams with a separate stream of liquid acid catalyst, jetting the resultant mixed streams upwardly through venturi-shaped passageways communicating with said settled catalyst phase, thereby creating an eductor effect in the lower portion of the reaction zone, moving liquid acid catalyst upwardly from said settled phase through said venturi-shaped passageways by said eductor effect, passing the admixed hydrocarbons and catalyst upwardly within the reaction zone and reacting the olefin with the isoparaffin in the presence of the catalyst, thereafter separating the catalyst from the reacted hydrocarbons and returning the same by gravity to the lower portion of the reaction zone.

2. The process of claim 1 further characterized in that said mixture of hydrocarbons is formed by spraying the olefinic hydrocarbon in multiple jet streams into a flowing stream of the isoparaffin hydrocarbon.

3. The process of claim 1 further characterized in that said admixed hydrocarbons and catalyst are passed upwardly through the central portion of the reaction zone and in that the separated catalyst is gravitated to the lower portion of said zone in an annular stream surrounding said central portion.

4. A contacting apparatus for fluids which comprises in combination, a vertically disposed housing, an open-ended cylindrical baffle positioned concentrically within and spaced from the inner wall and ends of said housing, a transverse baffle extending across the lower end of said cylindrical baffle and having a plurality of spaced openings therethrough, each of said openings having a venturi-shaped passageway means connecting therewith, fluid inlet means through the lower portion of said housing having fluid distributing means connecting therewith positioned below said transverse baffle, said distributing means having a plurality of outlet nozzles therefrom, with a nozzle being directed into each of said plurality of openings and venturi passageways of said transverse baffle whereby fluid recirculation within said housing is enhanced, additional fluid inlet means to the lower portion of said housing and conduit means connecting from said inlet means to each of the plurality of outlet nozzles and said distributing means, and contacted fluid outlet means from said housing at an elevation above the lower end of said cylindrical baffle.

5. The apparatus of claim 4 further characterized in that heat exchange tubes having fluid inlet and outlet means connecting thereto depend from the top portion of said housing into the space within said cylindrical baffle providing thereby means for passing a fluid in indirect heat exchange with fluids passing upwardly through said cylindrical baffle in said housing.

6. The apparatus of claim 4 further characterized in that fluid mixing means connects directly with said additional fluid inlet and said conduit means connecting to said distributing means, with said mixing means having an elongated chamber with at least two fluid inlet means connecting to an inlet end thereof and spaced internal baffle means adapted to effect flow mixing within said chamber.

7. A contacting apparatus for fluid streams which comprises in combination, a vertically disposed housing, an open-ended cylindrical baffle positioned concentrically within and spaced from the inner wall and ends of said housing, a transverse baffle extending across the lower end of said cylindrical baffle and having a plurality of spaced openings therethrough, a venturi-shaped passageway means connecting with each of said plurality of spaced openings, fluid inlet means extending through the lower portion of said housing and connecting with a fluid distributing ring positioned below said transverse baffle, said distributing ring having a plurality of outlet nozzles projecting upwardly therefrom, with a nozzle being directed into each of said plurality of openings and venturi passageways whereby fluid recirculation within said housing is enhanced by fluid being introduced into said housing, additional fluid inlet means to the lower portion of said housing connecting with a second fluid distributing ring and conduit means therefrom connecting to each of the plurality of fluid nozzles projecting upwardly from the first said distributing ring, and fluid outlet means extending from said housing at an elevation above the lower end of said cylindrical baffle.

8. The apparatus of claim 7 further characterized in that fluid mixing means connects with said additional fluid inlet means externally of said housing, said mixing means having an elongated chamber having connecting thereto at least two fluid inlet ports, with one of said ports having a perforated internally positioned conduit effecting the multiple jet introduction of one fluid medium into the surrounding fluid medium, and spaced internal baffle means within said chamber downstream from said perforated conduit section effecting a tortuous path and flow mixing of fluids within said mixing means prior to passing into said housing.

References Cited in the file of this patent
UNITED STATES PATENTS

| | | |
|---|---|---|
| 2,412,863 | Bolinger et al. | Dec. 17, 1946 |
| 2,607,662 | Huff | Aug. 19, 1952 |
| 2,618,534 | Mrstik | Nov. 18, 1952 |
| 2,720,447 | Jones et al. | Oct. 11, 1955 |
| 2,775,512 | Leithauser et al. | Dec. 25, 1956 |
| 2,937,079 | Van Pool | May 17, 1960 |
| 3,006,739 | Van Pool | Oct. 31, 1961 |